March 6, 1962 J. E. COLLINS 3,023,777
SOLENOID VALVE
Filed Nov. 22, 1955 2 Sheets-Sheet 1
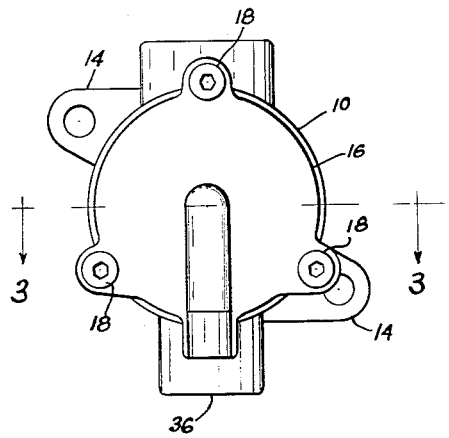
Fig.-2
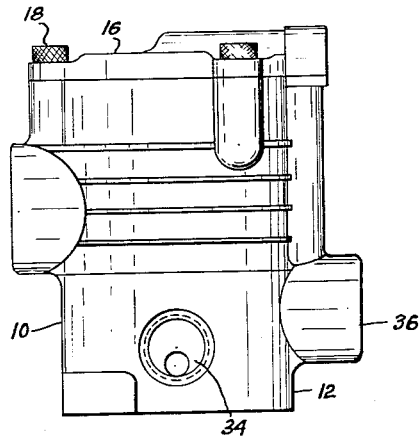
Fig.-4
Fig.-1
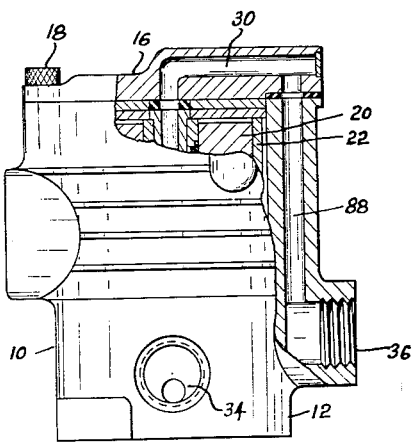
INVENTOR.
JOHN E. COLLINS
BY
Bates, Peare & McBean
ATTYS.

March 6, 1962   J. E. COLLINS   3,023,777
SOLENOID VALVE

Filed Nov. 22, 1955   2 Sheets-Sheet 2

INVENTOR.
JOHN E. COLLINS
BY
Bates, Teare & McBean
ATTYS.

United States Patent Office 3,023,777
Patented Mar. 6, 1962

3,023,777
SOLENOID VALVE
John E. Collins, Akron, Ohio, assignor, by mesne assignments, to International Basic Economy Corporation, New York, N.Y., a corporation of New York
Filed Nov. 22, 1955, Ser. No. 548,321
2 Claims. (Cl. 137—620)

This application relates to improvements in solenoid operated devices and more particularly to improvements in a solenoid valve of the plunger type.

One type of solenoid operated valve heretofore used has a double-headed vertical plunger that is vertically displaceable in response to the energization of a solenoid coil and is adapted to alternately engage top and bottom valve seats in the valve housing for sealing off the flow of a fluid as desired. The plunger is held against the top seat by energization of the solenoid coil and against the bottom seat by a spring. To ensure a tight seal, each end of the plunger is provided with a molded-in rubber insert, which directly engages the associated valve seat. Although this construction assures a tight seal, extra force is required to compress the rubber against its seat. For the bottom seat engagement, a strong spring is needed. In the top seat engagement, more power is required from the solenoid coil, for not only must the rubber be compressed sufficiently, but the coil is also working against a strong plunger spring as well as the pressure of the fluid flowing through the valve. With this arrangement, the valve cannot handle higher fluid pressures without a reduction in the diameters of the seats (to reduce the area the pressurized fluid would be working against), which would be a questionable alternative as the range of pressures the valve could handle would be materially reduced. Furthermore, whenever a molded-in rubber insert wears out, the complete plunger must be replaced.

Another difficulty common to valves of the above type is the inadvertent sticking of the plunger in its upper position. In valves of this structure, as the plunger head wears against the valve seat, the engaging surfaces of these two parts wear into each other so evenly and perfectly, that eventually a vacuum is created therebetween. The larger the contacting areas of these two mating surfaces, the more pronounced will be the vacuum therebetween. This vacuum effect, along with the residual magnetism normally present in the plunger, whenever the solenoid remains energized for a long length of time, often causes the plunger to remain momentarily or permanently in its upper position after the solenoid is de-energized.

An object of the invention is to provide a solenoid operated plunger valve wherein, in normal use, the only part that may need replacing is an O-ring in the valve seat.

Another object of the invention is to provide a solenoid operated plunger valve in which the residual magnetism in the plunger is substantially reduced, whereby the plunger is prevented from sticking in its upper position after the solenoid has been de-energized.

Other objects of the invention are to provide a solenoid operated plunger valve of standard size that is adapted to handle fluids at substantially increased pressures; to provide a valve which can undergo millions of cycles of hard service without maintenance troubles; and to provide a solenoid operated fluid valve having structural simplicity, reduced plunger chatter, long operating life with minimum maintenance, economy of manufacture, and ease of assembly of its parts.

Briefly, the foregoing objects are accomplished by the provision of a solenoid operated plunger valve having a double-headed plunger which alternately engages top and bottom valve seats, with each of the seats having a hard rubber or composition O-ring thereon. Each plunger head is of a reduced diameter (with respect to the plunger diameter), and is rounded off to enable the heads to enter the O-rings to produce an exceptionally tight seal. With this construction, the only part that may wear out and require replacing is the O-ring, which is relatively inexpensive. In addition, O-rings of this type are considerably resistant to wear and reduce plunger chatter to a minimum. Another advantage of this construction is the fact that a larger orifice is permitted in the valve seat, which enables the valve to handle a more complete range of air pressures. This feature results from the fact that there is very little rubber to compress in comparison with previous constructions, and thus the force needed to hold the plunger in its upper position is substantially reduced.

In addition, the invention substantially reduces the residual magnetism in the plunger by providing a non-magnetic material on the neck of the plunger. This may be accomplished for example by plating the end of the plunger adjacent the neck, with a hard chrome plate to a thickness of approximately one to two ten thousandths of an inch. This non-magnetic covering may be perforated or may cover completely the end surface of the plunger. This feature substantially eliminates the possibility of the plunger sticking in its upper position.

Referring to the drawings:

FIG. 1 is a side elevational view of a solenoid operated plunger valve in accordance with the invention;

FIG. 2 is a top plan view of the valve shown in FIG. 1;

FIG. 4 is a view corresponding to FIG. 1 but showing the exhaust duct system therein in section.

Figure 3:
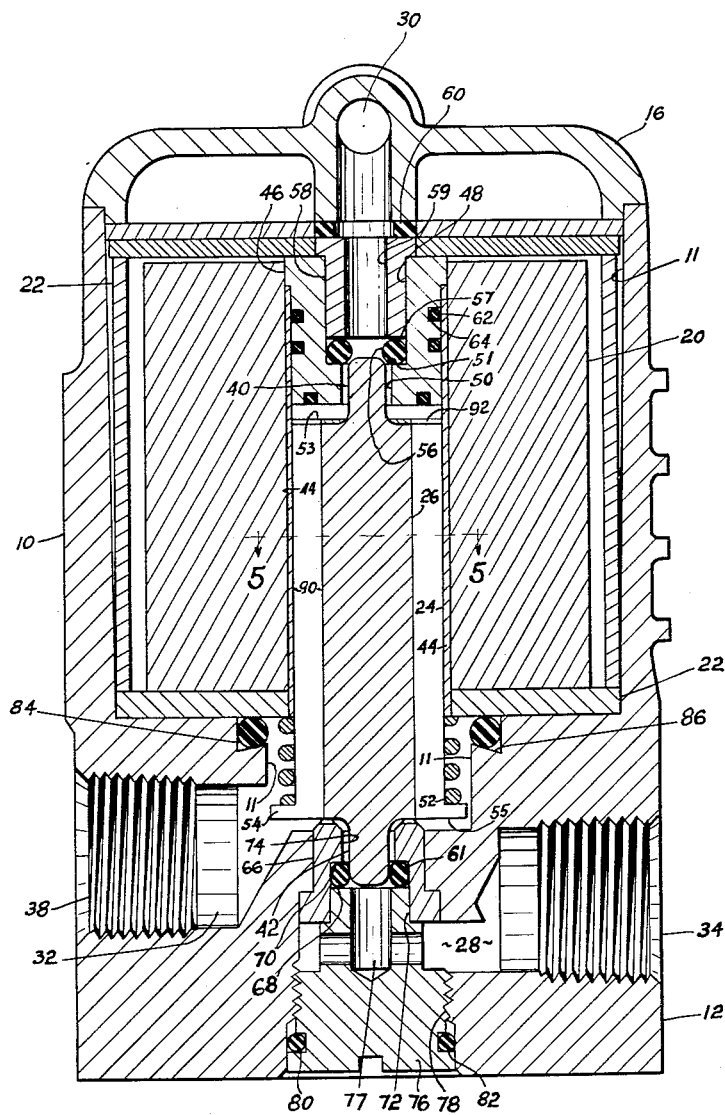
FIG. 3 is a vertical sectional view taken along line 3—3 of FIG. 2.

The solenoid operated valve in the present instance takes the form of a plunger type, three way fluid valve having three ports; however, the valve may be a two-way, four-way or any other type of solenoid operated device. The present three-way valve has a valve housing 10 having a hollow interior 11, which incorporates the solenoid coil structures and the various operating parts. The housing 10 includes a base 12, having mounting feet 14 (FIG. 2) formed integral therewith. A cap 16 is removably secured to the top of the housing by a plurality of screws 18 for facilitating assembly of the valve. An annular solenoid coil 20 (FIG. 3) is supported and mounted within the housing 10 by the annular member 22 forming a wall-like structure therebetween that also serves as a path of travel for the magnetic flux of the coil. The solenoid coil 20 along with the annular member 22 has a central bore 24, in which the plunger 26 is received for limited vertical displacement, as will be hereinafter described in more detail.

In communication with the bore 24 of housing 10 are inlet passageway 28 (FIG. 3), outlet passageway 30, and cylinder passageway 32, having at their outer ends inlet port 34, outlet port 36 (FIG. 4) and cylinder port 38 (FIG. 3) respectively. At their respective inner ends the passageways 30 and 28 are controlled by the plunger top and bottom heads 40 and 42 respectively on opposed ends of the metal plunger 26. The passageway 32 is in unimpeded communication with the central bore 24. Thus the three-flow passageways 28, 30 and 32 are in fluid communication with each other through the central bore 24 of the solenoid coil.

Disposed in the central bore 24 of the annular solenoid coil is a sleeve member 44 which is fixed with respect to the coil and its housing 10. Telescoped into the upper end of sleeve member 44 is a metal plug member 46, which has a substantially vertical bore 48 therethrough. the bore 48 has a restricted lower portion 50 forming a port at the lower end thereof to provide a continuous flow passage from passageway 32 or passageway 28 through passageway 30. A shoulder 51 is formed at the juncture of the bore 48 and its restricted portion 50.

The flow of fluid through the valve interior is controlled by the plunger 26, which is made of metallic or other paramagnetic material for attraction by the electric solenoid coil 20 when energized so that it is readily drawn upward through the central bore 24 of the solenoid coil to a raised or upper position. A spring 52 surrounds the lower end of the plunger and is compressed between the lower end of sleeve 44 and the plunger flange 54, to normally keep the plunger in a downward position (FIG. 1). Disposed at opposite ends of the plunger are valve closure means in the form of the aforementioned upper and lower valve heads 40 and 42, this being a feature of the invention. The plunger heads are of a diameter less than that of the plunger to form the upper and lower neck portions 53 and 55. The outer ends of the upper and lower valve heads are tapered to effect a tight seal when they engage the upper and lower valve seats respectively.

The upper valve seat assembly 57 comprises the aforementioned plug 46, in which an O-ring 56 is seated on the shoulder 51 in the bore 48. The O-ring is secured in position by a sleeve member 58, which is telescoped into the plug bore 48. The sleeve 58 has a bore 59 which connects the passageway 30 with the central bore 24 to form an unimpeded passageway therebetween. A resilient backup member or rubber washer 60 is disposed between the sleeve 58 and the cap 16, to snub the action of, and to reduce the noise caused by the impact between the plunger 26 and the upper valve seat assembly, during operation of the solenoid valve. The spring 52 aids the rubber washer 60 in this respect also. A circular rubber seal 62 is carried in the annular groove 64 in the plug 46 for sealingly engaging the bore 24 to prevent fluid leakage therebetween. The complete assembly is held in position by the cap member 16, which is affixed to the valve housing 10 by the screws 18 as aforementioned.

The bottom valve seat assembly 61 comprises a sleeve member 66, in which an O-ring 68 is seated on the shoulder 70 in the bore 72 therein. The shoulder 70 is formed at the juncture of the bore 72 and its restricted portion 74. The O-ring 68 and the sleeve 66 are held in position by a base plug 76, which is screwed into the threaded opening 78 in the base 12 of housing 10. A circular rubber seal 80 is carried in the annular groove 82 in the plug 76 to prevent fluid leakage between the plug and the base 12. The plug 76 has a T-shaped passageway 77, which connects passageway 28 with the central bore 24 forming an unimpeded communication therebetween.

An O-ring 84 is disposed on the shoulder 86 in the hollow interior 11 of the housing 10 to prevent fluid leakage between the housing and the base of the annular member 22.

Operation of the solenoid valve will now be described. The plunger 26 is arranged for limited axial movement within the bore 24 of the sleeve member 44. Energization of the solenoid coil 20 holds the plunger 26 in a raised position wherein the upper valve head 40 sealingly engages the O-ring 56. Thus when the solenoid coil 20 is energized, the plunger 26 is raised causing the upper valve head 40 to seal off the port formed at the lower end of passageway 30. With the plunger in this position, the fluid cannot flow from the central bore 24 to exhaust passageway 30. However the fluid can flow from the inlet passageway 34, through passageway 28, through the T-shaped passageway 77 in the base plug 76, past the lower valve assembly which is now open, through the lower end of the central bore 24, through the passageway 32 and out the cylinder port 38 (thus supplying pressurized fluid to a cylinder or the like).

Figure 5:
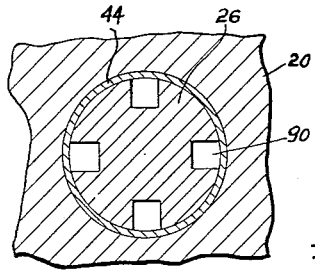
FIG. 5 is a horizontal sectional view taken along line 5—5 of FIG. 3.

If the solenoid coil 20 is deenergized, the force of spring 52 pushes the plunger downward to its lower position (FIG. 3). In this position the lower valve head 42 sealingly engages the O-ring 68 on lower valve seat assembly to prevent the flow of fluid from the passageway 28. However, fluid flow can now take place from the cylinder port 38 through the passageway 32, through the central bore 24, past the upper valve assembly which is now open, through the bore 59 of sleeve 58, through passageway 30, down passageway 88 (FIG. 4) and out the exhaust port 36, thus exhausting the cylinder. Even though the plunger 26 is disposed in the central bore 24, the fluid may flow through the bore because of the fact that grooves or slots 90 (FIGS. 3 and 5) are formed in the surface of the plunger throughout its entire length.

After millions of cycles of operation, the only parts likely to wear out are the O-rings in the valve seats. The plunger heads are relatively free from wear, this being a feature of the invention. The present construction enables facile replacement of these upper and lower valve seat O-rings. The upper O-ring 56 is replaced by removing the cap 16, the resilient washer 60 and the sleeve member 58. The O-ring is then removed from the shoulder 51 in the plug member 46 and a new ring inserted, the aforementioned parts then being returned to their respective positions.

The lower O-ring 68 is replaced by unscrewing the lower plug 76 from the opening 78 in the base 12, after which it may be removed easily from the shoulder 70 in the bore 72 of the lower sleeve member 66. A new ring may then be inserted and the plug 76 is screwed back into position in the housing base 12.

The present construction enables the solenoid valve to handle a higher range of fluid pressures, since the area of rubber (O-ring) the plunger 26 compresses is relatively small. Thus the force needed to hold the plunger in its upper position is substantially reduced and a larger orifice or port in the upper and lower valve assemblies may be used. Additionally, a more positive seal is provided between the plunger heads and their respective O-rings, with the result that plunger chatter is substantially reduced.

Another feature of the invention is the prevention of the plunger 26 from inadvertently remaining in its upper position, by reason of the residual magnetism which is normally present in the plunger 26, whenever the solenoid coil remains energized for a long length of time. This causes the plunger to remain momentarily or permanently in its upper position after the coil is de-energized. This objection is overcome by providing a non-magnetic material 92 (FIG. 3) on the neck portion 53 of the plunger. This may be accomplished for example by plating the neck portion with a hard chrome plate to a thickness of approximately one to two ten thousandths of an inch. The plating may be a continuous layer or perforated as desired. This feature provides a non-magnetic gap between the end of the plunger and the lower end of member 46, and thereby reduces the "holding effect" of the residual magnetism in the plunger, and substantially eliminates the possibility of the plunger inadvertently remaining in its upper position of after the solenoid is de-energized.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

I claim:

1. A fluid control valve having (a) a tube,
 (b) a plunger reciprocal in the tube,
 (c) a solenoid encircling a part of the tube and one end of the plunger, (d) a flow passageway with a cylindrical mouth concentric with the tube,
(e) a seat assembly in the tube between said mouth and said end of the plunger and serving as a stop for said end of the plunger,
(f) an opening through the seat assembly which is concentric with the tube,
(g) a plunger head of circular cross section on said end of the plunger which is of less cross-sectional area than the plunger and also smaller than said opening through the seat assembly and is concentric with the tube, the outer end of said head being tapered,
(h) a resilient annular ring held against said mouth and being concentric therewith, said ring being at that end of the opening through the seat assembly which is opposite said end which serves as a stop for the plunger,
(i) said end of the plunger and said seat being composed entirely of metal whereby the end of the stroke of the plunger toward said plunger is maintained constant being limited by contact of the plunger with the seat assembly,
(j) the metal of the plunger and the seat assembly each comprising a metal conductor of the magnetic flux of the coil and forming a part of the path of travel of said flux, and when the plunger and seat assembly are brought into contact said conductors are always brought into the same space relation with one another with a distance of no more than two ten thousandths of an inch between the nearest portions of said two metal conductors,
(k) means biasing said plunger away from said seat assembly,
(l) said end of the plunger being brought toward the seat assembly in response to energization of said coil whereby the plunger head is projected through said resilient ring against the force of said biasing means and thereby forms a liquid-tight seal with the ring, and the end of the plunger is brought against the seat assembly,
(m) the plunger head thereby being sealed within the resilient ring independently of the space relationship between the seat assembly and the end of the plunger, and the end of the stroke of the plunger toward said seat assembly remaining constant due to its being determined by the seating of the end of the plunger on the seat assembly, and the ends of the metal conductors which carry the magnetic flux always being thereby brought into a predetermined and constant space relationship at said end of the stroke with no more than two ten thousandths of an inch between them.

2. A fluid control valve having a valve housing with inlet, outlet and cylinder ports therein, (a) a tube in said housing connecting said ports,
(b) a plunger reciprocal in the tube,
(c) a solenoid encircling a part of the tube and one end of the plunger,
(d) a flow passageway with a cylindrical mouth concentric with the tube,
(e) a seat assembly in the tube between said mouth and said end of the plunger and serving as a stop for said end of the plunger,
(f) an opening through the seat assembly which is concentric with the tube,
(g) a plunger head of circular cross section on said end of the plunger which is of less cross-sectional area than the plunger and also smaller than said opening through the seat assembly and is concentric with the tube, the outer end of said head being tapered,
(h) a resilient annular ring held against said mouth and being concentric therewith, said ring being at that end of the opening through the seat assembly which is opposite said end which serves as a stop for the plunger,
(i) said end of the plunger and said seat being composed entirely of metal whereby the end of the stroke of the plunger toward said plunger is maintained constant being limited by contact of the plunger with the seat assembly,
(j) the metal of the plunger and the seat assembly each comprising a metal conductor of the magnetic flux of the coil and forming a part of the path of travel of said flux, and when the plunger and seat assembly are brought into contact said conductors are always brought into the same space relation with one another with a distance of no more than two ten thousandths of an inch between the nearest portions of said two metal conductors,
(k) means biasing said plunger away from said seat assembly,
(l) said end of the plunger being brought toward the seat assembly in response to energization of said coil whereby the plunger head is projected through said resilient ring against the force of said biasing means and thereby forms a liquid-tight seal with the ring, and the end of the plunger is brought against the seat assembly,
(m) the plunger head thereby being sealed within the resilient ring independently of the space relationship between the seat assembly and the end of the plunger, and the end of the stroke of the plunger toward said seat assembly remaining constant due to its being determined by the seating of the end of the plunger on the seat assembly, and the ends of the metal conductors which carry the magnetic flux always being thereby brought into a predetermined and constant space relationship at said end of the stroke with no more than two ten thousandths of an inch between them.

References Cited in the file of this patent

UNITED STATES PATENTS

| | | |
|---|---|---|
| 1,270,170 | Kingsbury | June 18, 1918 |
| 2,267,515 | Wilcox | Dec. 23, 1941 |
| 2,515,029 | Almond | July 11, 1950 |
| 2,569,751 | Dube et al. | Oct. 2, 1951 |
| 2,574,054 | Miller | Nov. 6, 1951 |
| 2,587,357 | McPherson | Feb. 26, 1952 |
| 2,630,326 | Bryant | Mar. 3, 1953 |
| 2,632,341 | Arp | Mar. 24, 1953 |
| 2,700,307 | Thoresen | Jan. 25, 1955 |
| 2,713,989 | Bryant | July 26, 1955 |
| 2,718,876 | Williams | Sept. 27, 1955 |
| 2,726,676 | Manning | Dec. 13, 1955 |

FOREIGN PATENTS

| | | |
|---|---|---|
| 623,478 | Great Britain | May 18, 1949 |